United States Patent
Shinde et al.

(10) Patent No.: US 10,834,198 B2
(45) Date of Patent: Nov. 10, 2020

(54) EDGE SIDE DYNAMIC RESPONSE WITH CONTEXT PROPAGATION FOR IOT

(71) Applicant: International Business Machines Corporation, Armonk, NY (US)

(72) Inventors: Rakesh Shinde, Pune (IN); Harish Bharti, Pune (IN); Abhay Patra, Pune (IN); Rajesh Kumar Saxena, Pune (IN)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 15/718,755

(22) Filed: Sep. 28, 2017

(65) Prior Publication Data

US 2019/0098091 A1    Mar. 28, 2019

(51) Int. Cl.
*H04L 29/08*     (2006.01)
*H04L 12/24*     (2006.01)

(52) U.S. Cl.
CPC .......... *H04L 67/125* (2013.01); *H04L 41/12* (2013.01); *H04L 41/046* (2013.01); *H04L 41/0806* (2013.01)

(58) Field of Classification Search
CPC ... H04L 41/046; H04L 41/0806; H04L 41/12; H04L 67/125
See application file for complete search history.

(56) References Cited

U.S. PATENT DOCUMENTS

| | | | |
|---|---|---|---|
| 2014/0241354 A1* | 8/2014 | Shuman | H04L 67/16 370/390 |
| 2015/0016359 A1 | 1/2015 | Wang et al. | |
| 2016/0128043 A1 | 5/2016 | Shuman et al. | |
| 2016/0380968 A1* | 12/2016 | Sarwar | H04W 88/16 709/245 |
| 2017/0279631 A1* | 9/2017 | Britt | H04L 12/2816 |
| 2018/0288159 A1* | 10/2018 | Moustafa | H04W 4/70 |
| 2019/0098091 A1* | 3/2019 | Shinde | H04L 67/125 |
| 2019/0250899 A1* | 8/2019 | Riedl | H04L 9/3247 |

\* cited by examiner

*Primary Examiner* — Hitesh Patel
(74) *Attorney, Agent, or Firm* — Scully, Scott, Murphy & Presser, P.C.; Robert Shatto, Esq.

(57) ABSTRACT

A method, system and computer program product are disclosed for creating a dynamic heterogeneous IoT network from existing IoT network devices to identify and implement a dynamic response to an event. In an embodiment, the method comprises identifying an occurrence of a specified event; and creating a heterogeneous IoT network to respond to the event, including selecting a master IoT device and identifying one or more participatory IoT devices for the created network from multiple IoT devices from one or more existing IoT networks. The master IoT device is in bidirectional communications with the participatory IoT devices. The master device identifies a response to the specified event, translates the response into commands, and sends the commands to the participatory IoT devices to implement the response. The master IoT device may pass control to another master device in another heterogeneous IoT network if the response is not accomplished.

19 Claims, 13 Drawing Sheets

| DEVICE CHARACTERISTICS | PARTICIPATION PRINCIPLES |
| --- | --- |
| • DISTANCE RANGE TO LOOK FOR DEVICES<br>• FOCUS LOCATION<br>• DEVICE TYPES<br>• DEVICES<br>   • DEVICE CAPABILITIES (IMAGE CAPTURE, IMAGE RECOGNITION, VIDEO STREAM ANALYTICS)<br>   • COMPUTING CAPABILITIES<br>   • DEVICE LOCATION | • OVER ANY TRANSPORT LAYER PROTOCOL<br>• GRADIENTS OF RESPONSE<br>• MINIMUM DATA EXCHANGE<br>• COMMUNICATE WITH MASTER ONLY |

FIG. 7

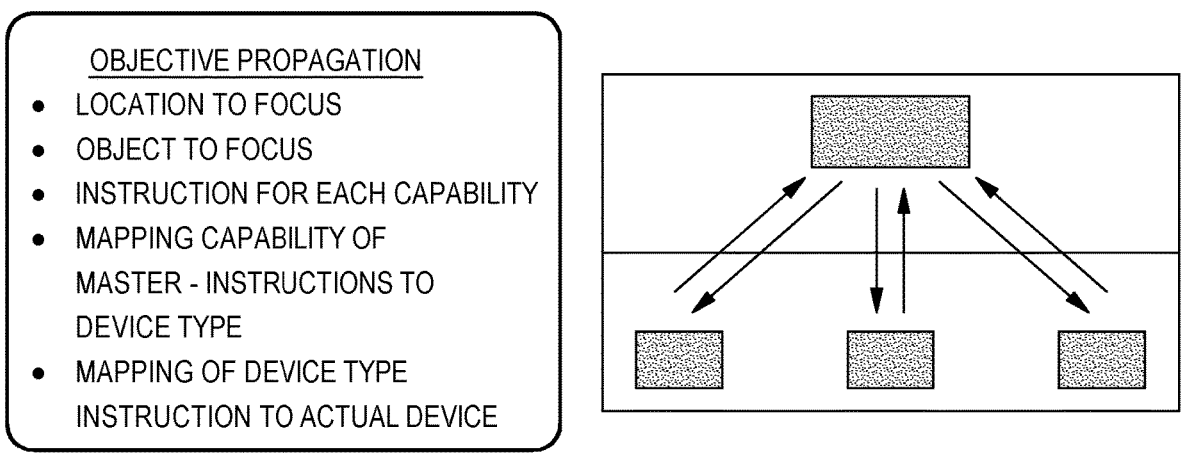

OBJECTIVE PROPAGATION
- LOCATION TO FOCUS
- OBJECT TO FOCUS
- INSTRUCTION FOR EACH CAPABILITY
- MAPPING CAPABILITY OF MASTER - INSTRUCTIONS TO DEVICE TYPE
- MAPPING OF DEVICE TYPE INSTRUCTION TO ACTUAL DEVICE

SECURITY MECHANISM EMPLOYED BY THE FRAMEWORK AND METHOD:
- OBJECTIVE CONTEXT ARE ENCRYPTED USING HASH FUNCTION
- THE KEY USED TO SECURITIES THE DATA ARE CONTROLLED IN THE HASH FUNCTIONS
- KEY USED BY NEXT MASTER DEVICE TO DECRYPT THE OBJECTIVE CONTEXT
- OBJECTIVE CONTEXT IS STORED AS A SERIALIZED DATA STORE

FIG. 10

EDGE SIDE DYNAMIC RESPONSE WITH CONTEXT PROPAGATION FOR IOT

BACKGROUND

This invention generally relates to the Internet of Things (IoT), and more specifically, to edge side dynamic response with context propagation for IoT.

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communication network (e.g., an ad hoc system or the Internet).

The Internet of Things extends previous concepts of connectivity of processing systems and devices; and in IoT, devices that are network enabled can be connected for a bidirectional communication and utilized for solving real time problems of the world. However, it is practically infeasible for all the IoT devices to possess significant computing, networking and storage capabilities to leverage traditional IPv6 type of internet protocol or processing capability of next generation processors. Given these constraints, the typical IoT solutions compromise on the true potential of IoT by confining the processing, storage and coordination to IoT centralized Super Agents or servers. This results in a severe limitation to achieving the true potential of IoT on edge devices and networks, where the "On the Edge" processing and execution are critical for high performing use cases. A central connecting network can be a bottleneck for high performance. In real time scenarios or use cases, where dynamic response is expected with high performance and speed, the typical IoT solutions fall short of addressing the requirements.

SUMMARY

Embodiments of the invention provide a method, system and computer program product for creating a dynamic heterogeneous IoT network from existing IoT network devices to identify and implement a dynamic response to an event. In an embodiment, the method comprises identifying an occurrence of a specified event; and creating a dynamic heterogeneous IoT network to respond to the specified event, including selecting a master IoT device for the created network from multiple IoT devices from one or more existing IoT networks, and identifying one or more participatory IoT devices for the created IoT network from the IoT devices of the existing IoT networks, wherein the master IoT device is in bidirectional communication with each of the participatory IoT devices. The IoT master device identifies a response to the specified event, and the IoT master device translates the response into device specific commands and sends the device specific commands to the participatory IoT devices to implement the response.

Embodiments of the invention leverage the IoT on edge devices to provide a dynamic response for real time scenarios or use cases where "on the edge" processing and execution are critical and connecting to a central network and super-agent/servers is a bottleneck for high performance.

Embodiments of the invention provide a dynamic response by the IoT devices on the edge for real time scenarios that demand high performance and speed.

Embodiments of the invention provide a method and framework for one of the IoT devices in a group of IoT edge devices to become a master in a given situation, and to control surrounding IoT devices to respond to a specified event until a specified response to the event is accomplished or some other IoT device takes control of the IoT device group, providing completely on the edge coordination of the IoT edge devices to the specified event.

Embodiments of the invention detect an event which requires one of the devices to become a master device. The master device announces an intent or response to be achieved to deal with the event. The master device translates the event response into device commands to all the devices on the edge that are required to participate in this event response. The event response comprises an event lifecycle, taking events back to a steady state. The method and framework can wait for another IoT device on the edge to become master and take control, or for any additional event.

BRIEF DESCRIPTION OF THE SEVERAL VIEWS OF THE DRAWINGS

FIG. 7 shows a semantic model for discovery of participatory edge nodes in an embodiment of the invention.

FIG. 10 illustrates the propagation of command and instructions from the master device to a participatory edge node in an embodiment of the invention.

DETAILED DESCRIPTION

Figure 1:
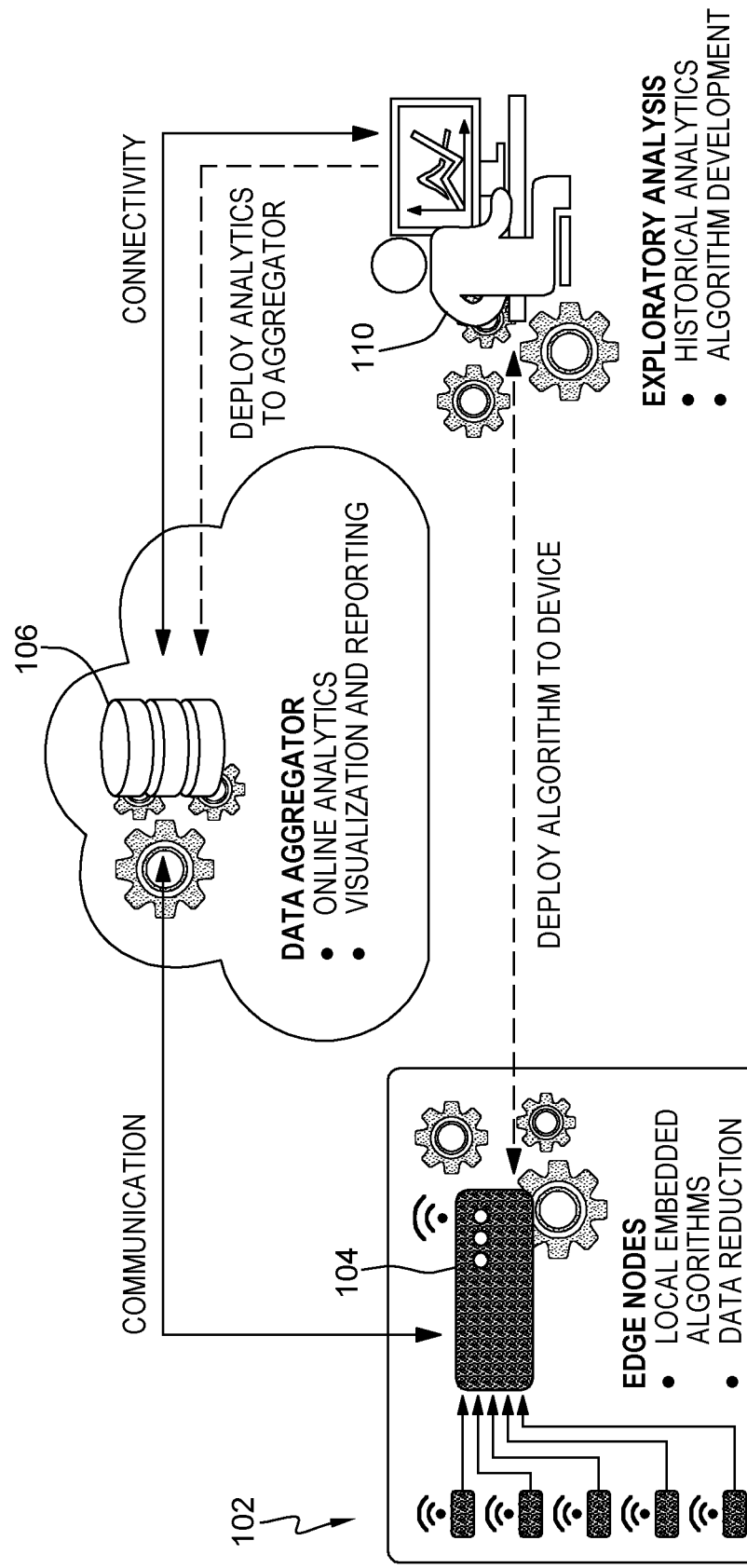
FIG. 1 provides an overview of a prior art system using edge nodes in an IoT network.

FIG. 1 illustrates a conventional IoT network comprised of a series of edge nodes 102. The edge nodes may be any suitable IoT devices, and these devices collect various types of data. The IoT devices may have local embedded algorithms and may perform processing of the data, and, for example, the IoT devices may perform data reduction operations. The edge nodes send the data to an access point 104, and the data may be transmitted to the access point via wired connections or wirelessly. From access point 104, the data are sent to a data aggregator 106. At the data aggregator, the collected data may be available, for instance, for online analytics, and may also be available for visualization and reporting.

An analyst 110 may access the data to conduct historical analytics, to develop algorithms, and for a variety of other purposes. As represented in FIG. 1, the analyst may also deploy analytics to be aggregated to the data aggregator, and may deploy algorithms to the IoT devices 102.

In the network of FIG. 1, multiple IoT devices or device groups may be connected to and communicate with each other via an IoT server (not shown) or an IoT super agent. In the network of FIG. 1, the data aggregator 106 can play the role of the IoT super-agent, and the system that executes historical analytics and algorithm development for analyst 110 can play the role of IoT server. The IoT server or super agent can manage inter-group communications. Also, the IoT super agent may correspond to, or include, the functionality of the access point. As another alternative, the IoT super agent may correspond to, or include the functionality of an IoT server. Further, the IoT super agent may also encapsulate gateway functionality.

As mentioned above, connecting to a central network and super-agent/server is a bottleneck that limits the performance of IoT edge devices. The prior art systems do not provide the type of dynamic response by the IoT devices on the edge that is needed for real time scenarios that demand high performance and speed. One of the key problems of existing IoT device edge networks is that edge nodes are static and these retain control and intelligence which is a significant limitation to leverage the power of IoT devices in homogeneous or heterogeneous IoT networks.

Embodiments of the invention provide a method and framework for one of the IoT devices in a group of IoT edge devices to become a master in a given situation, and to control surrounding IoT devices to respond to a specified event until a specified response to the event is accomplished or some other IoT device takes control of the IoT device group, providing completely on the edge coordination of the IoT edge devices to the specified event. Embodiments of the invention eliminate the current limitations of typical IoT solutions for dependence on a central agent or Iot server for event response. Embodiments of the invention also remove the bottleneck of a central connecting network to achieve high performance.

Figure 2:
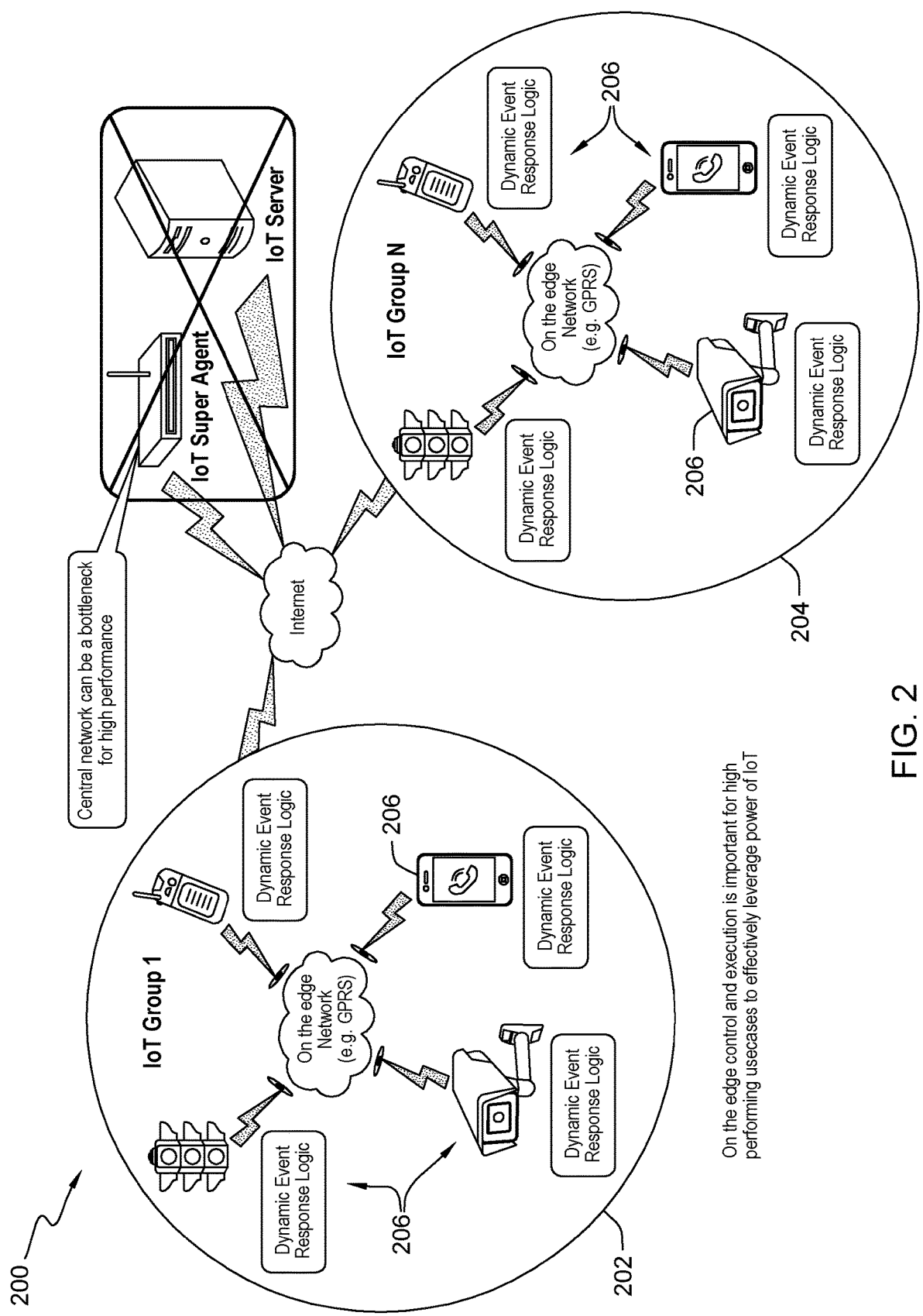
FIG. 2 illustrates an IoT on the edge network in accordance with an embodiment of the invention.

FIG. 2 shows an IoT on the edge network 200, in accordance with an embodiment of the invention, for dynamic response without depending on the central super-agent, IoT server and network. FIG. 2 shows two groups 202 and 204 of IoT devices 206; and in this example, each group includes a traffic light, a closed circuit television (CCTV) camera, and two cell phones.

In an implementation of embodiments of the invention, an event, referred to as a trigger event or an incident trigger, is detected that requires one of the IoT devices 206 to become a master device. Once selected, the master device determines an intent or response to be achieved to deal with the event, and the master device discovers the participatory IoT devices required for the dynamic response. The master device translates the event response into device commands for the IoT devices in group 1 that are needed to participate in this event response, and the master device sends these commands to the necessary IoT devices. The IoT devices in the group work together to help achieve the desired response to the event. The event response may comprise an event lifecycle, taking events back to a steady state. The method and framework can wait for another IoT device on the edge to become a master device and take control, or any additional event.

As represented in FIG. 2, in embodiments of the invention, the IoT device groups can be used in this way without the need for an IoT super agent or an IoT server.

Embodiments of the invention enable edge IoT devices in heterogeneous IoT networks to generate an instantaneous incident response that is comprehensible and actionable by other IoT devices primarily on the edge without much coordination with a central IoT server, infrastructure or super agents. The method enables propagating action from one IoT edge network to a next, suitable IoT edge network.

Embodiments of the invention include an objective based discovery of the master device on the IoT edge based on a compatible set of objectives, e.g., the location to focus on, computer and storage capability, and cached similar objective context, etc., in the location contextual edge network.

In embodiments of the invention, objective context is the contextual information about the objective response that is needed for an event. The objective contextual information may include, but is not limited to, the objective to achieve e.g. location to focus, object to track or trace or monitor etc., device capabilities required e.g. image capture, image recognition, video stream analytics etc. The objective context may also include the location contextual information as to where the objective response is needed.

In embodiments of the invention, location context is the contextual information about the location to focus where the dynamic objective response is needed. The location contextual information may include, but is not limited to, location attributes e.g. the location that is contextual to the identified event, the boundary of geo spatial coordinates that is the focus for executing the objective(s), distance range of the objects to track or trace or monitor, and distance range for multiple IoT devices from one or more existing IoT networks to participate in the dynamic response etc.

Embodiments of the invention also include an objective discovery of other participatory edge devices by the master device based on distance range, device type, device capabilities and focus location etc. in the location contextual edge network.

In embodiments of the invention, the master device executes the objective context in a given location/edge network. The master device maps the objective context to device specific instructions such as a minimalist set of instructions for other node devices {e.g., giveecontrol( ), giveData( ), takeAction( ), etc.} and sends the instructions to participatory edge devices for execution. The master device receives the output/status from these other participatory edge devices.

In embodiments of the invention, the master device also propagates objective context to another master device to take control in another adjacent location/edge network if objective context is not met based on desired outcome and it becomes necessary to propagate the objective context. In embodiments of the invention, the master device propagates an encrypted context to the other master. In addition, the master device maintains the status and history of objective contexts in which the master device participated in a serialized data store.

Embodiments of the invention provide a method and framework for an IoT on the edge dynamic response system that provides a distinct advantage of on the edge processing and execution that are critical for high performing use cases. Embodiments of the invention eliminate the current limitation of typical IoT solutions for dependence on a central super-agent or IoT server for event response. Embodiments of the invention also remove the bottleneck of a central connecting network to achieve high performance.

Figure 3:
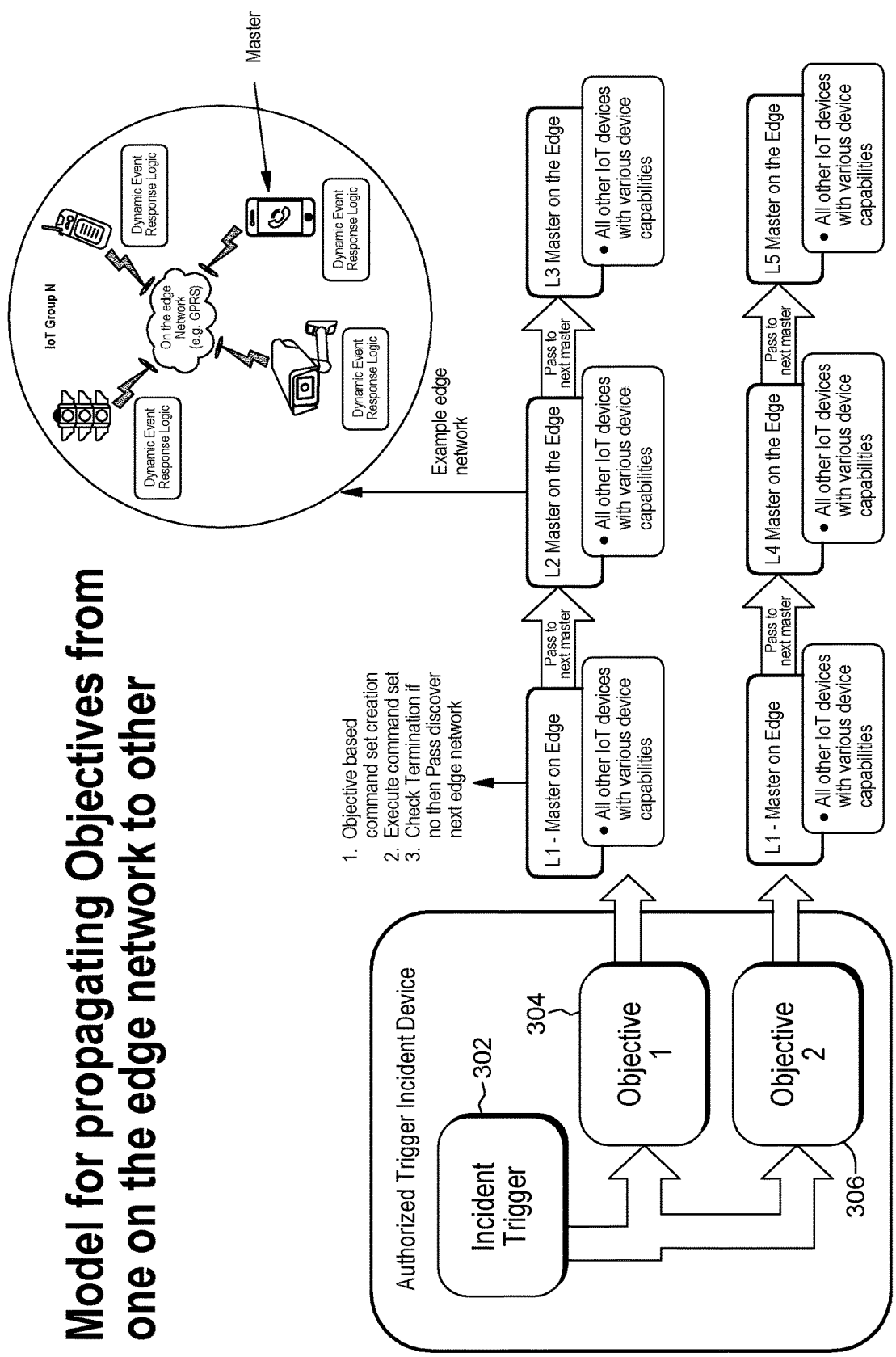
FIG. 3 shows a model for propagating objectives from one on the edge network to another on the edge network in accordance with an embodiment of the invention.

FIG. 3 illustrates a model for propagating objectives from one on the edge network to another on the edge network. At 302, an incident trigger occurs. Two objectives 304 and 306 are identified for this incident and a master device is selected. An objective based command set is created, and the command set is executed. The system checks to determine if the response is terminated. If the response has not been terminated, then discover is passed to the next edge network.

The master device on the edge is selected based on compute and storage capabilities available to be the master. At a time, the master device will accommodate only a compatible set of objectives (e.g., two objectives that focus on the exact same location, but monitor two objects in that location are compatible). When the master device receives an additional objective which is equal or lower in priority to a previously received objective and which is not compatible with that previous objective, the master device will discard that additional objective. However, if the additional objective has a higher priority than the previously received objective, then the master device will discard the previous objective. As represented in FIG. 3, control of the response to the event can be passed from one master device to another master device, as discussed in more detail below.

Figure 4:
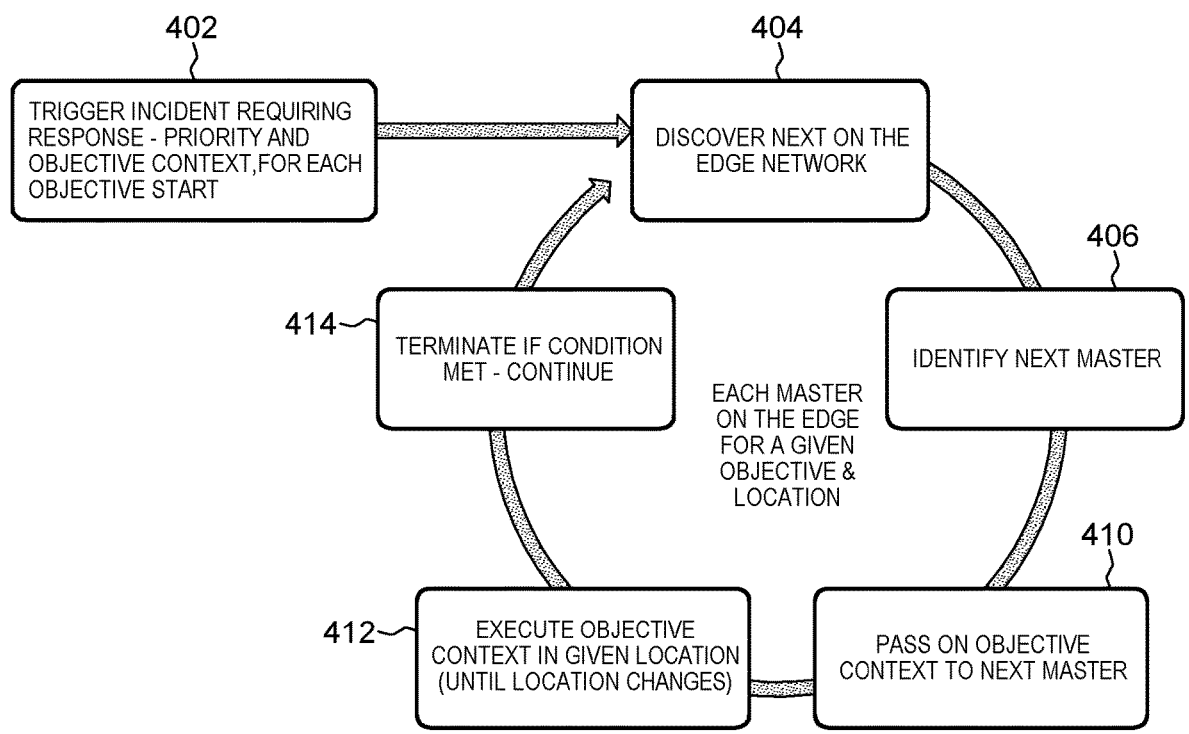
FIG. 4 illustrates an incident response flow in an edge network in an embodiment of the invention.

The incident response flow on the edge network is illustrated in FIG. 4. At 402, a trigger incident requiring response occurs. A priority and objective context are determined. For each objective, a process, or thread, starts.

Step 404 is to discover the next on the edge network, and step 406 is to identify the next master device. At 410, the objective context is passed on to the next master device. At 412, the executive objective context in given location (until location changes). At 414, the process terminates if a specified condition is met, otherwise the process continues. Steps 404, 406, 410, 412 and 414 may be repeated until the specified condition is met; and when this happens, the process terminates at 414. In this process, each master operates on the edge for a given objective and location.

Figure 5:
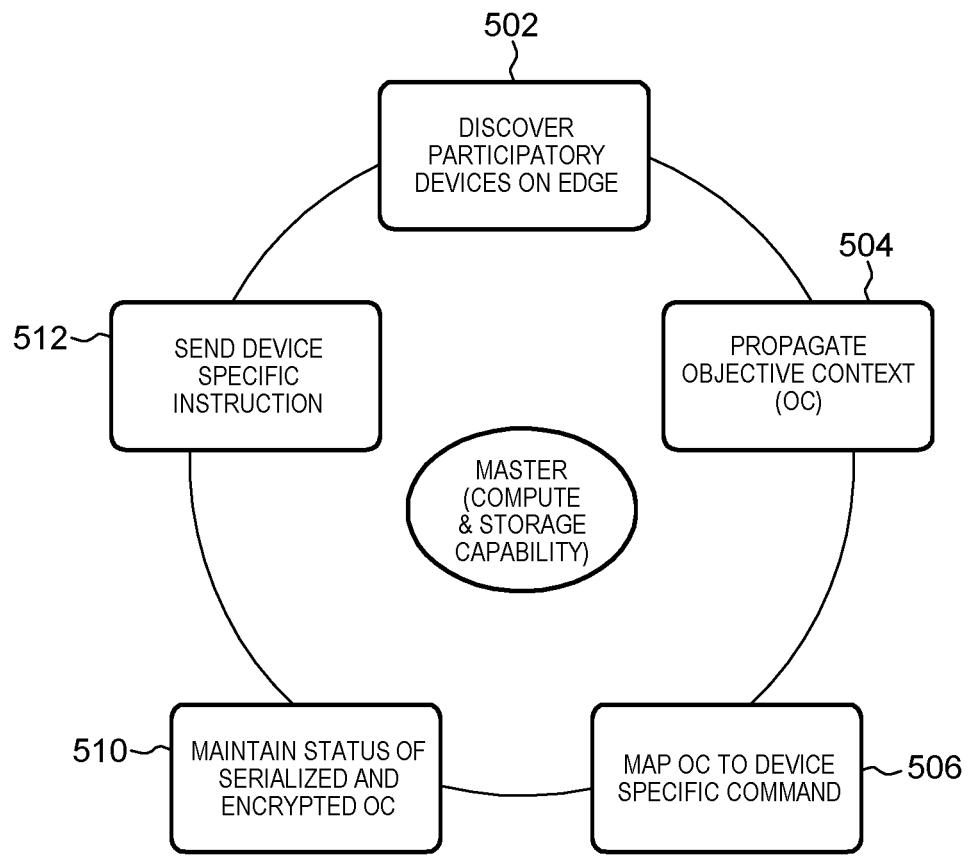
FIG. 5 shows the key capabilities of a master device of an edge network in an embodiment of the invention.

Key capabilities of the master device are shown in FIG. 5. These capabilities include discovering participatory devices on the edge 502, propagating the objective context 504, mapping the objective context to device specific commands 506, maintaining the status of serialized and encrypted objective contexts 510, and sending device specific instructions 512. The master device has the compute and storage capability needed for these capabilities.

Figure 6:
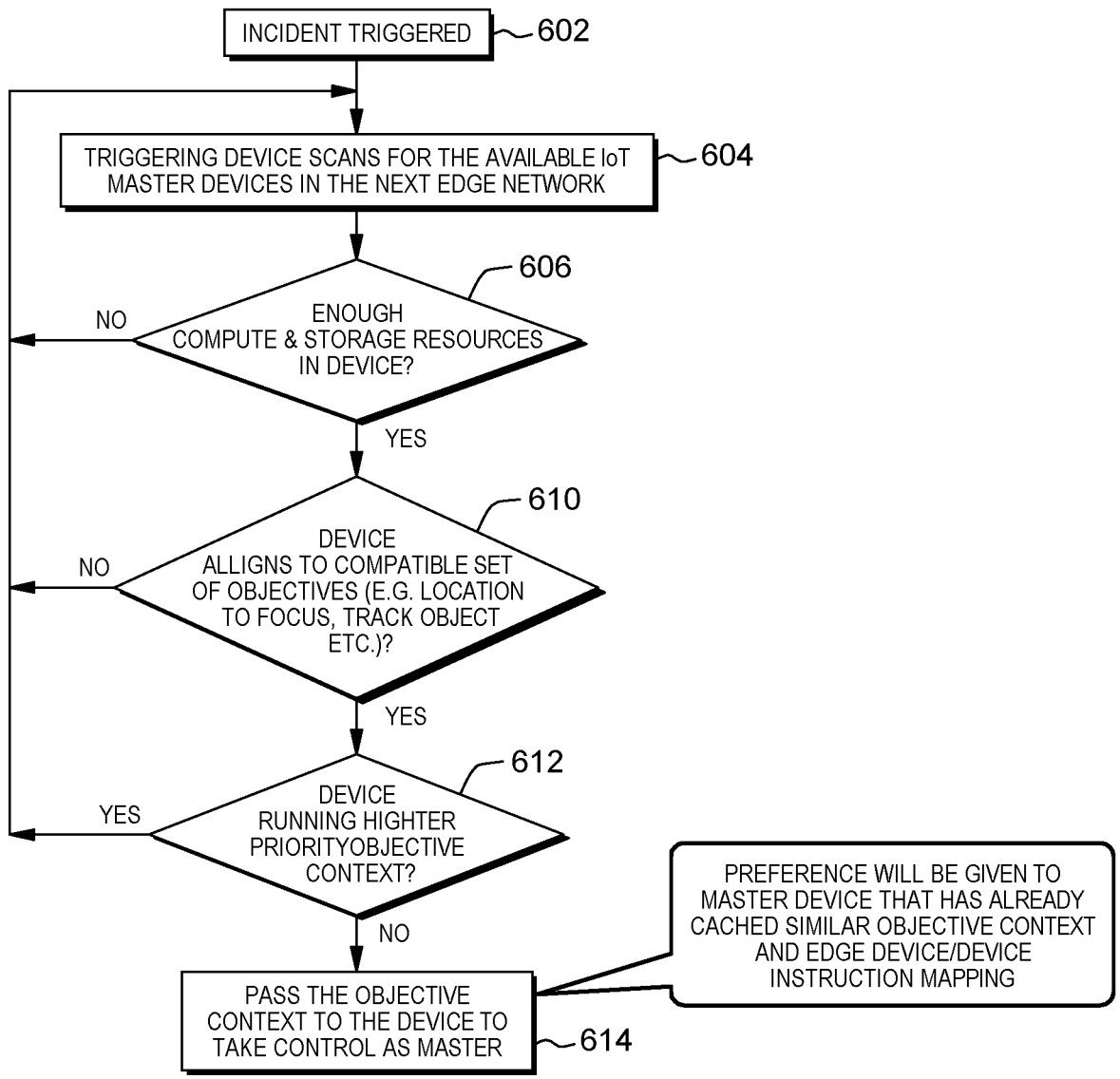
FIG. 6 shows a procedure for discovering a master device for an edge network in an embodiment of the invention.

Discovery of the master device is shown in the flow diagram of FIG. 6. In this Figure, 602 represents an incident triggered; and at 604, a triggering device scans for the available IoT master devices in the next edge network. At 606, a potential master device is checked to determine if it has enough compute and storage resources to be the master. If the potential master device has sufficient compute and storage resources, the procedure moves on to step 610. If the potential master device does not have sufficient compute and storage resources, the procedure returns to step 604, and steps 604 and 606 are repeated until a device is found that has the sufficient resources, in which case the process proceeds from step 606 to step 610.

At 610, a potential master device is checked to determine if it aligns to a compatible set of objectives (e.g., location to focus, track object, etc.). If, the potential master device aligns to a compatible set of objectives, the procedure moves on to 612. If the potential master device does not align with a compatible set of objectives, the procedure returns to step 604, and steps 604, 606 and 610 are repeated until a device is found that has the sufficient resources and also aligns to a compatible set of objectives, in which case the process proceeds from step 610 to step 612.

At 612, a potential master device is checked to determine if it is running a higher priority objective context. If the potential master device is not running a higher priority objective context, the procedure moves to step 614. If the potential master device is running a higher priority objective context, the procedure returns to step 604, and steps 604, 606, 610 and 612 are repeated until a device is found that has the sufficient resources, aligns to a compatible set of objectives, and is not running a higher priority objective context, in which case the process proceeds from step 612 to step 614. In this case, the potential master device has all the requirements needed to be a master device, and the potential master device is selected to be the master device.

At 614, the objective context is passed to the selected master device, and this device takes control of the group or network of IoT devices.

In case more than one device is eligible to be the master device, preference is given to a device that has already cached a similar objective context and edge device/device instruction mapping.

A semantic model for discovery of participatory edge nodes is described in FIG. 7. As illustrated in this Figure, in order for an IoT device to be eligible to participate in a network, the device, in embodiments of the invention, has specified characteristics and is able to operate according to specified principles.

Device characteristics may, for example, include a specified distance range, focus location, and device types. Distance range refers to the ability of a device to look for, or identify and communicate with, other devices within a specified range. Focus location refers to the ability of a device to sense or to generate data about events in a particular location of interest or focus. Also, some groups or networks may be limited to devices of certain types. A group or network may also require devices that have certain capabilities, such as image capture, image recognition, or video stream analytics. A group or network may require devices that have certain computing capabilities, or that are in a particular location.

Necessary participation principles may include the ability to operate over any transport layer protocol, gradients of response capabilities, and minimum data exchange capabilities. A group or network may also require that IoT devices be able to communicate only with the master device.

Figure 8:
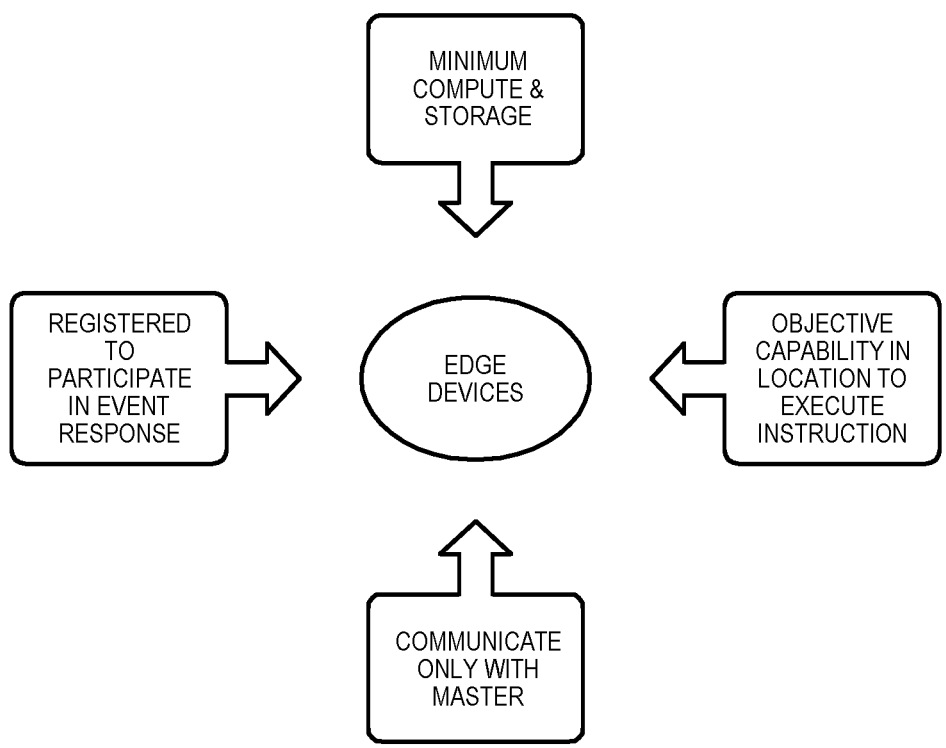
FIG. 8 illustrates key capabilities of a participatory edge device in an embodiment of the invention.

FIG. 8 illustrates key capabilities of the participatory edge device. The participatory edge device needs to have the minimum compute and storage capabilities, and an objective capability, in the location, to execute instructions. The participatory edge device needs to be able to work with edge devices that communicate only with the participatory edge device, and the participatory edge device needs to be registered to participate in the event response.

Figure 9:
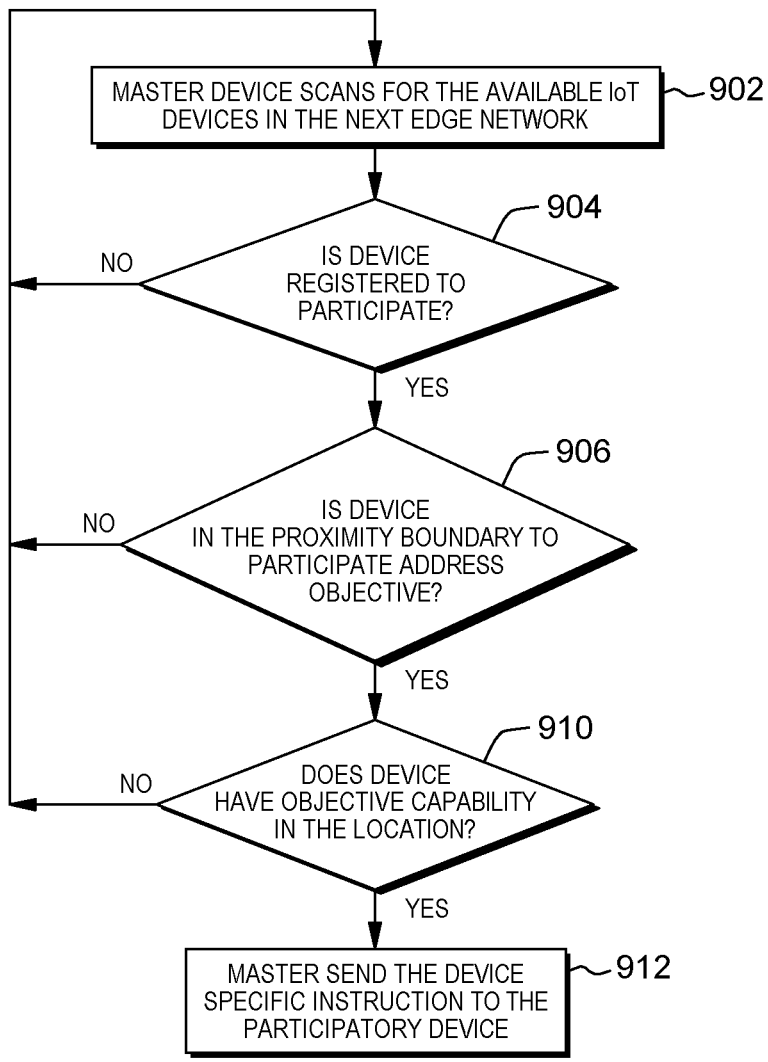
FIG. 9 shows an algorithm for the discovery of participatory edge devices in an embodiment of the invention.

The discovery of participatory edge devices is illustrated in the flow diagram of FIG. 9. At 902, the master device scans for the available IoT devices in the next edge network. At 904, a potential device is checked to determine if it is registered to participate in the network. If the potential participatory device is registered, the process moves on to step 906. If the device is not registered, the device is rejected for participation in the network, and the process returns to step 902, and steps 902 and 904 are repeated until a device is found that is registered, in which case the process proceeds from step 904 to step 906.

At step 906, the potential participatory device is checked to determine if the device is in the proximity boundary to participate address objective. If the device is in the proximate boundary to participate address objective, the procedure moves on to step 910. If the device is not in the proximate boundary to participate address objective, the procedure returns to step 902, and steps 902, 904 and 906 are repeated until a device is found that is registered and also is in the proximity boundary to address objective, in which case the procedure proceeds to step 910.

At step 910, the potential participatory device is checked to determine if the device has objective capability in the location. If the device has objective capability in the location, the process moves on to step 912. If the potential participatory device does not have the objective capability, the procedure returns to step 902, and steps 902, 904 and 906 are repeated until a potential device is found that that is registered, is in the proximity boundary to address objective, and has the objective capability in the location; and in this case, the device is selected to be a participatory device and the process moves on to step 912. At this step, the master device sends specific instructions to the participatory device.

FIG. 10 shows the command/instruction propagation from the master device to a participatory edge device. In order to propagate a command/instruction, location to focus and object to focus. Location to focus refers to a defined location of interest, and object to focus refers to the objective of the IoT network. The master device identifies a set of capabilities of the IoT network, and identifies an instruction or instructions for each capability. Mapping capability of master-instructions to device type. The master device maps the instructions to device types, and maps each device type instruction to an actual device.

In embodiments of the invention, security mechanisms may be employed. For instance, the objective contexts may be encrypted using hash functions, and the keys used to secure the data are controlled in the hash functions. When control is passed from one master device to another, or next, master device, the key is used by the next master device to decrypt the objective context. Also, the objective context is stored as a serialized data store.

Figure 11:
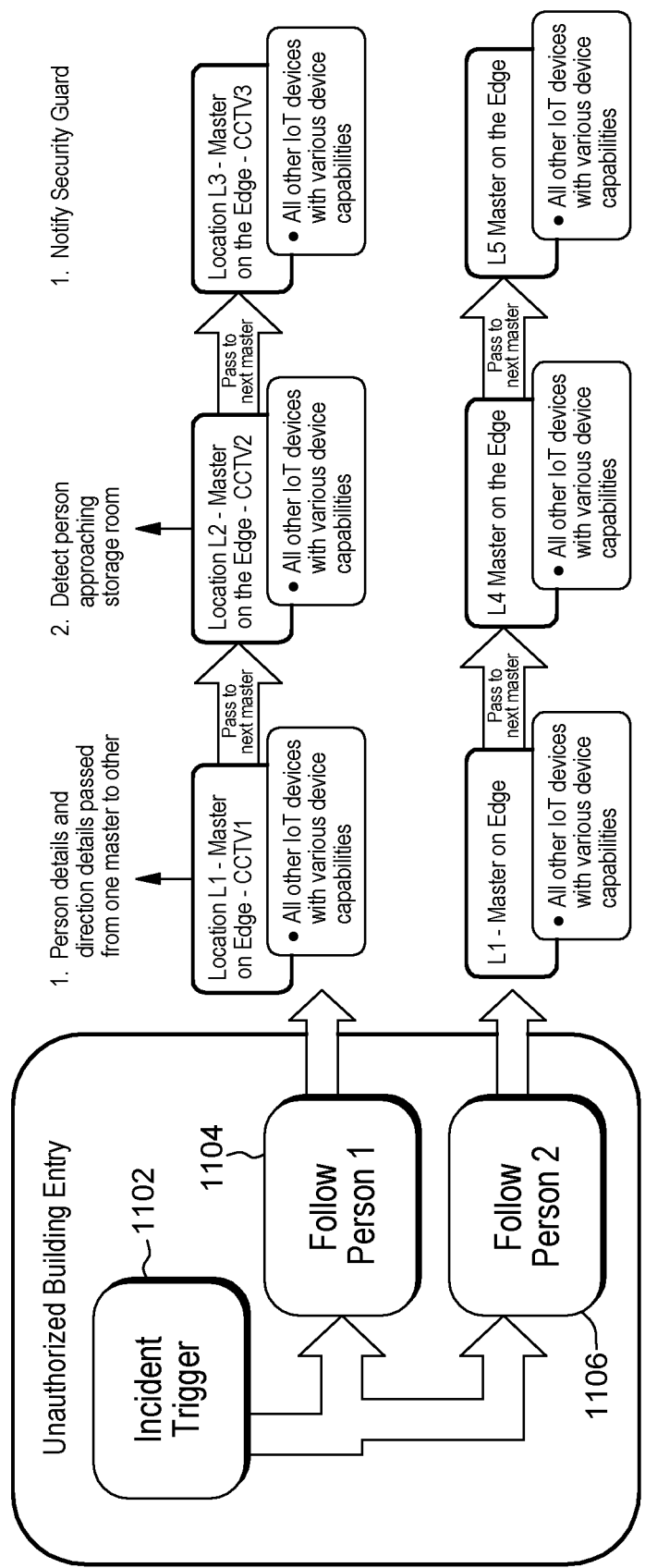
FIG. 11 illustrates an example of an implementation of an embodiment of the invention.

FIG. 11 illustrates an example of an embodiment of the invention. In this example, an unauthorized building entry occurs causing an incident trigger 1102 to be reported from a handheld device, such as a cell phone, at the incident site. The handheld device instructs all IoT devices to focus in a range around particular coordinates of the building. A few people are found by the handheld device and each person is then tracked by the IoT devices. As a closed circuit television (CCTV) camera detects a person moving in a particular direction, the CCTV camera instructs other IoT devices in that direction to follow the person. In this example, two threads 1104 and 1106 are created for two people going in different directions.

A person is detected approaching a storage room where a security guard is nearby. The security guard is notified of the person approaching the storage room and the security guard follows the person, the security guard's handheld device interacts with IoT devices on the edge to track the person's location as the security guard arrives to contact the person.

In this example, several master devices are used. The first master device, for instance, may be the CCTV camera that detected the person moving in a particular direction. Control can be passed to the next master device which could be another CCTV camera that detected the person approaching the storage room. This master device may instruct participatory devices to track the person. Control can be passed to the next master device that is located on the edge. Likewise, several master devices can be used to control the thread used to follow a second person. The first master device could be the same CCTV camera that detected the first person moving in a particular direction. It could detect movement of the second person as well. Control can be passed to another master device on the edge, and then to another master device on the edge as the second person is tracked by the IoT devices.

Figure 12:
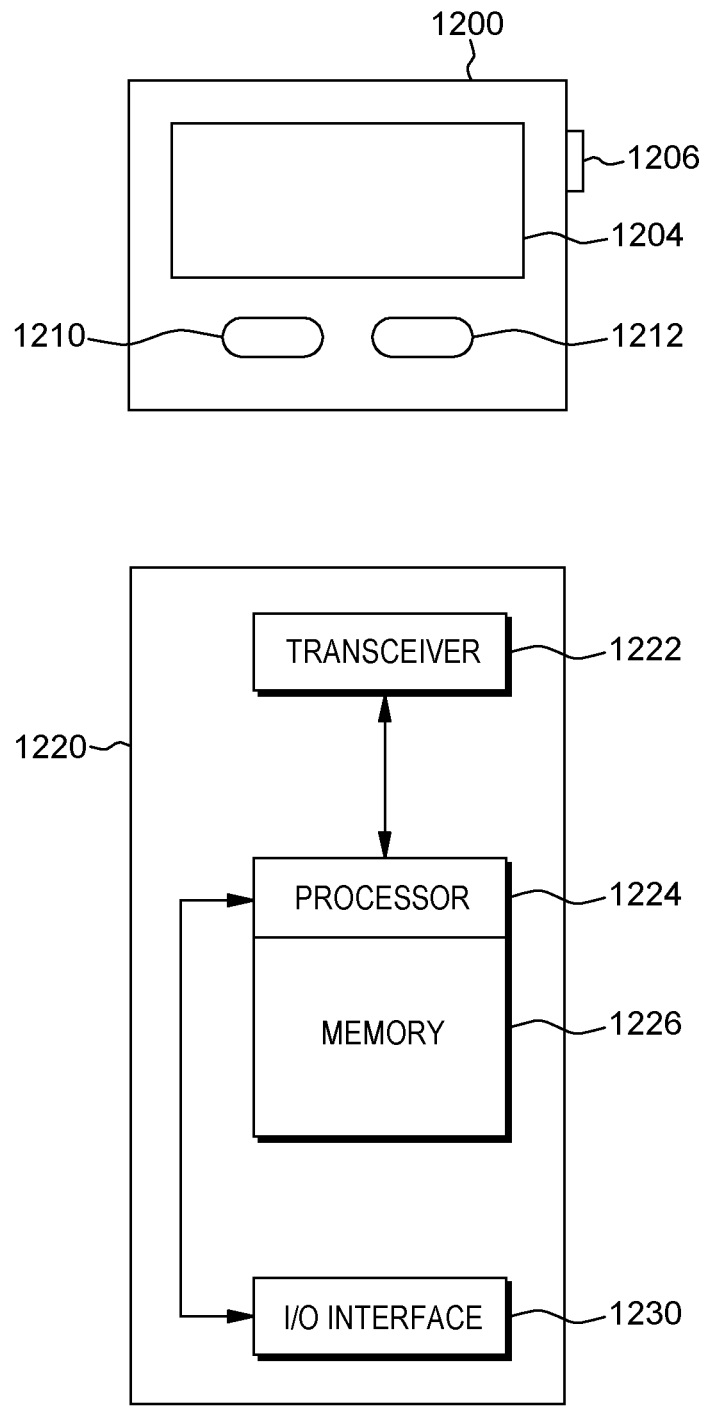
FIG. 12 schematically shows an IoT device that may be used in embodiments of the invention.

FIG. 12 illustrates an example of an IoT device 1200 that may be used in embodiments of the invention. In this example configuration, an external casing 1202 of the IoT device may be configured with a display 1204, a power button 1206, and two control buttons 1210 and 1212, among other components, as is known in the art. The display 1204 may be a touchscreen display, in which case the control buttons 1210 and 1212 may not be necessary. While not shown explicitly as part of the IoT device 1200, the IoT device may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices can be embodied with different hardware configurations, a basic high-level configuration for internal hardware components is shown as platform 1220 in FIG. 12. The platform 1220 can receive and execute software applications, data and/or commands transmitted over a network interface and/or a wired interface. The platform 1220 can also independently execute locally stored applications. The platform 1220 can include one or more transceivers 1222 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 1224, such as a microcontroller, microprocessor, application specific integrated circuit, digital signal processor (DSP), programmable logic circuit, or other data processing device, which will be generally referred to as the processor 1224.

The processor 1224 can execute application programming instructions within a memory 1226 of the IoT device 1200. The memory can include one or more of read-only memory (ROM), random-access memory (RAM), electrically erasable programmable ROM (EEPROM), flash cards, or any memory common to computer platforms. One or more input/output (I/O) interfaces 1230 can be configured to allow the processor 1224 to communicate with and control various I/O devices such as the display 1204, power button 1206, control buttons 1210 and 1212 as illustrated, and any other devices, such as sensors, actuators, relays, valves, switches, etc. associated with the IoT device 1200.

Figure 13:
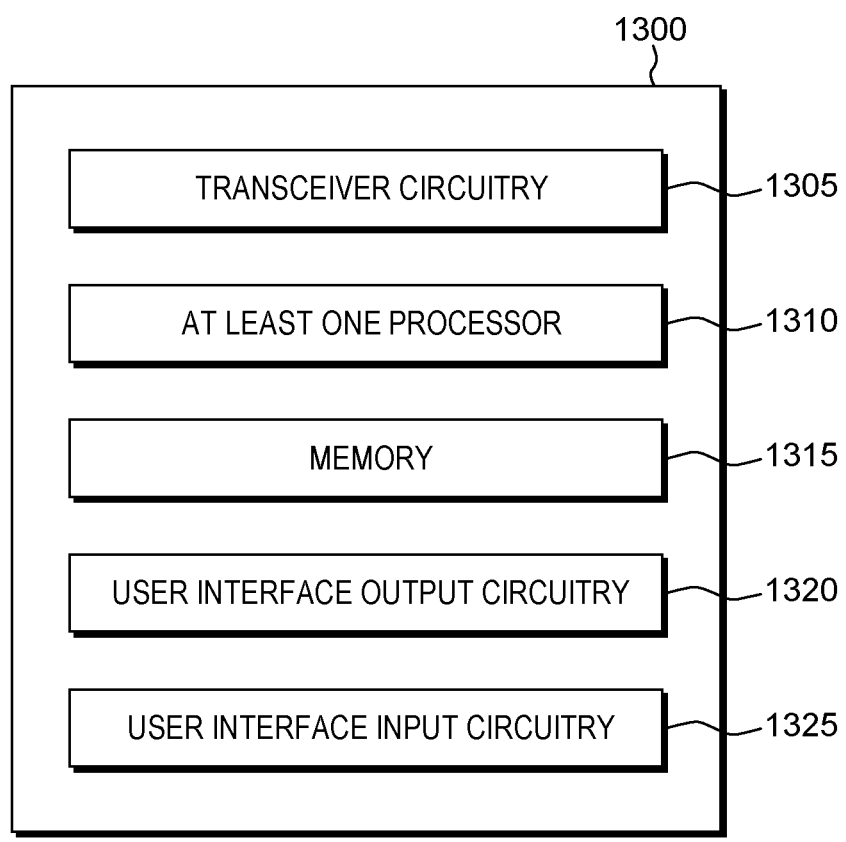
FIG. 13 shows components of an IoT device that may be used in embodiments of the invention.

FIG. 13 illustrates a communications system 1300 that may be used in IoT devices in embodiments of the invention. Generally, the communication device 1300 comprises transceiver circuitry 1305, at least one processor 1310, and memory 1315, and optionally, the communications device further includes user interface output circuitry 1320, and user interface input circuitry 1325. Transceiver circuitry 1305 is configured to transmit and/or receive information. In an example, the transceiver circuitry can include a wireless communication interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the transceiver circuitry 1305 can correspond to a wired communication interface (e.g., a serial connection, a USB or Firewire connection, an Ethernet connection through which the Internet can be accessed, etc.).

The transceiver circuitry 1305 can also include software that, when executed, permits the associated hardware of the transceiver circuitry to perform the reception and/or transmission function(s) associated therewith.

The at least one processor 1310 is configured to process information. Example implementations of the type of processing that can be performed by the at least one processor 1310 include but are not limited to performing determinations, establishing connections, making selections between different information options, performing evaluations related to data, interacting with sensors coupled to the communication device 1300 to perform measurement operations, converting information from one format to another (e.g., between different protocols), and so on. For example, the at least one processor 310 can include a general purpose processor, a DSP, an ASIC, a field programmable gate array (FPGA) or other programmable logic device, discrete gate or transistor logic, discrete hardware components, or any combination thereof designed to perform the functions described herein. The at least one processor 1310 can also include software that, when executed, permits the associated hardware of the at least one processor 1310 to perform the processing function(s) associated therewith.

The memory 1315 is configured to store information. In an example, the memory 1315 can include at least a non-transitory memory and associated hardware (e.g., a memory controller, etc.). For example, the non-transitory memory included in the memory 1315 can correspond to RAM, flash memory, ROM, erasable programmable ROM (EPROM), EEPROM, registers, hard disk, a removable disk, a CD-ROM, or any other form of storage medium known in the art.

The communication device 1300 further optionally includes user interface output circuitry 1320 configured to present information. In an example, the user interface output circuitry 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1300.

The communication device 1300 further optionally includes user interface input circuitry 1325 configured to receive local user input. In an example, the user interface input circuitry 1325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1300.

While the structural components 1305 through 1325 are shown as separate or distinct blocks in FIG. 13, those skilled in the art will appreciate that the various structural components 1305 through 1325 may be coupled to one other via an associated communication bus (not shown) and further that the hardware and/or software through which the respective structural components 1305 through 1325 perform the respective functionality associated therewith can overlap in part. For example, any software used to facilitate the functionality associated with the structural components 1305 through 1325 can be stored in the non-transitory memory associated with the memory 1315, such that the configured structural components 1305 through 1325 each perform the respective functionality associated therewith (i.e., in this case, software execution) based in part upon the operation of the software stored in the memory configured to store information 1315. Likewise, hardware that is directly associated with one of the structural components 1305 through 1325 can be borrowed or used by other structural components 1305 through 1325 from time to time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of creating a dynamic heterogeneous IoT network from existing IoT network devices to identify and implement a dynamic response to an event, the method comprising:
   identifying an occurrence of a specified event, including identifying an objective context for the specified event and a priority for the objective context;
   creating a dynamic, heterogeneous on an edge IoT network, from a given group of on the edge IoT devices from one or more existing IoT networks, to respond to the specified event, including
      selecting one or more of the on the edge IoT devices as a master IoT device for the created network, including scanning the edge IoT devices for available IoT master devices, identifying one of the edge IoT devices as a potential IoT master device, determining whether the potential IoT master device meets specified criteria, including determining whether the potential IoT master device is running another objective context having a higher priority than the objective context for the specified event, and selecting the potential IoT master device as the master IoT device when the potential IoT master device meets the specified criteria, and
      identifying one or more of the on the edge IoT devices from the given group of on the edge IoT devices as one or more participatory IoT devices for the created IoT network, wherein the master IoT device is in bidirectional communication with each of the participatory IoT devices to control the created network, providing on the edge coordination of the IoT edge devices of the created network;
   the IoT master device identifying a desired response to be achieved to deal with the specified event; and
   the IoT master device translating the desired response to be achieved to deal with the specified event into device specific commands and sending the device specific commands to the participatory IoT devices, and wherein the edge IoT devices of the created edge IoT network use the device specific commands to work together to implement the desired response to the specified event; and wherein:
   the selecting a master IoT device for the created IoT network further includes passing the objective context for the specified event to the selected master IoT device; and
   the selected master IoT device takes control of the created IoT network.

2. The method according to claim 1, wherein the master device has a history of participating in responses to a plurality of events, each of the plurality of events having an objective context for responding to the event, and the method further comprises:

the master device maintaining a status and history of the objective contexts in which the master device has participated in a serialized data store.

3. The method according to claim 1, wherein the creating a dynamic heterogeneous IoT network to respond to the specified event includes:

identifying a location context for responding to the event.

4. The method according to claim 3, wherein:

the selecting a master IoT device for the created network further includes identifying as the master IoT device one or more of the edge IoT devices having a defined capability based on the location context for responding to the event; and the IoT master device identifying a response to the specified event includes the IoT master device using the objective context and the location context to identify the response to the event.

5. The method according to claim 1, wherein the selecting a master IoT device for the created IoT network includes:

identifying a first master IoT device for the created network to control the response to the specified event;

identifying a second master IoT device; and the first master IoT device transferring control of the response to the second master IoT device.

6. The method according to claim 5, wherein the selecting a master IoT device for the created ioT network further includes the first master Iot device propagating an encrypted context to the second IoT device for responding to the specified event.

7. The method according to claim 1, wherein:

the creating a dynamic heterogeneous network to respond to the specified event includes creating a first dynamic heterogeneous IoT network from the edge IoT devices, and creating a second dynamic heterogeneous IoT network from the IoT devices of the one or more existing IoT networks;

the selecting a master IoT device for the created network includes selecting a first master IoT device for the first created network to control the response to the specified event, and selecting a second master IoT device for the second created network; and the method further comprises the first master IoT device transferring the objective context and the location context to the second master IoT device to control the response to the specified event.

8. The method according to claim 1, wherein:

the creating a dynamic heterogeneous IoT network to respond to the specified event includes using a specified IoT device to trigger creation of the dynamic heterogeneous IoT network; and the scanning the edge IoT devices for available IoT master devices includes using the specified IoT device to scan the existing networks.

9. The method according to claim 1, wherein the creating a dynamic heterogeneous IoT network to respond to the specified event includes creating the dynamic heterogeneous Iot network in response to identifying the occurrence of the specified event.

10. The method according to claim 1, wherein:

the one or more existing IoT networks include one or more of an IoT gateway, a super agent or a central network server to coordinate communications among the Iot devices of the existing IoT networks; and the creating a dynamic heterogeneous IoT network to respond to the specified event, the IoT master device identifying a response to the specified event, and the IoT master device translating the response into device specific commands and sending the device specific commands to the participatory IoT devices to implement the response are performed without using any of said IoT gateway, super agent or central network server.

11. A system for creating a dynamic heterogeneous IoT network from existing IoT network devices to identify and implement a dynamic response to an event, the system comprising:

a trigger sub-system for identifying an occurrence of a specified event, including identifying an objective context for the specified event and a priority for the objective context, and triggering a creation of a dynamic heterogeneous on an edge IoT network, from a given group of on the edge IoT devices from one or more existing IoT networks, to respond to the specified event, including selecting one of the on the edge IoT devices as a master IoT device for the created network, including scanning the edge IoT devices for available IoT master devices, identifying one of the edge IoT devices as a potential IoT master device, determining whether the potential IoT master device meets specified criteria, including determining whether the potential IoT master device is running another objective context having a higher priority than the objective context for the specified event, and selecting the potential IoT master device as the master IoT device when the potential IoT master device meets the specified criteria, and identifying one or more of the on the edge IoT devices from the given group of on the edge IoT devices as one or more participatory IoT devices for the created IoT network, wherein the master IoT device is in bidirectional communication with each of the participatory IoT devices to control the created network, providing on the edge coordination of the IoT edge devices of the created network;

the IoT master device for identifying a desired response to be achieved to deal with the specified event, for translating the desired response to be achieved to deal with the specified event into device specific commands, and for sending the device specific commands to the participatory IoT devices, and wherein the edge IoT devices of the created edge IoT network use the device specific commands to work together to implement the desired response to the specified event; and wherein:

the selecting a master IoT device for the created IoT network further includes passing the objective context for the specified event to the selected master IoT device; and the selected master IoT device takes control of the created IoT network.

12. The system according to claim 11, wherein the trigger sub-system identifies a location context for responding to the event.

13. The system according to claim 12, wherein:

the trigger sub-system identifies one or more of the edge IoT devices having a defined capability based on the objective context and the location context for responding to the event; and IoT master device uses the objective context and the location context to identify the response to the event.

14. The system according to claim 11, wherein:
the selecting a master IoT device for the created IoT network includes identifying a first master IoT device for the created network to control the response to the specified event, and identifying a second master IoT device; and
the first master IoT device transfers control of the response to the second master IoT device.

15. The system according to claim 11, wherein:
triggering a creation of a dynamic heterogeneous IoT network to respond to the specified event, includes
creating a first dynamic heterogeneous IoT network from the edge IoT devices of the one or more existing IoT networks,
identifying an objective context for responding to the event,
identifying a location context for responding to the event, and
creating a second dynamic heterogeneous IoT network from the edge IoT devices;
the selecting a master IoT device for the created network includes
selecting a first master IoT device for the first created network to control the response to the specified event, and
selecting a second master IoT device for the second created network; and
the first master IoT device transfers the objective context and the location context to the second master IoT device to control the response to the specified event.

16. A computer program product for creating a dynamic heterogeneous IoT network from existing IoT network devices to identify and implement a dynamic response to an event, the computer program product comprising:
a non-transitory computer readable storage medium having program instructions embodied therein, the program instructions executable by a computer to cause the computer to perform the method of:
receiving input identifying an occurrence of a specified event, including identifying an objective context for the specified event and a priority for the objective context; and
creating a dynamic heterogeneous on an edge IoT network, from a given group of on the edge IoT devices from one or more existing IoT networks, to respond to the specified event, including
selecting one of the on the edge IoT devices as a master IoT device for the created network from multiple IoT devices, including scanning the edge IoT devices for available IoT master devices, identifying one of the edge IoT devices as a potential IoT master device, determining whether the potential IoT master device meets specified criteria, including determining whether the potential IoT master device is running another objective context having a higher priority than the objective context for the specified event, and selecting the potential IoT master device as the master IoT device when the potential IoT master device meets the specified criteria, and
identifying one or more of the on the edge IoT devices from the given group of on the edge IoT devices as one or more participatory IoT devices for the created IoT network, wherein the master IoT device is in bidirectional communication with each of the participatory IoT devices to control the created network, providing on the edge coordination of the IoT edge devices of the created network; and
operating the IoT master device to identify a desired response to be achieved to deal with the specified event, to translate the desired response to be achieved to deal with the specified event into device specific commands, and to send the device specific commands to the participatory IoT devices, and wherein the e wherein:
the selecting a master IoT device for the created IoT network further includes passing the objective context for the specified event to the selected master IoT device; and
the selected master IoT device takes control of the created IoT network,
dge IoT devices of the created edge IoT network use the device specific commands to work together to implement the desired response to the specified event; and
wherein:
the selecting a master IoT device for the created IoT network further includes passing the objective context for the specified event to the selected master IoT device; and
the selected master IoT device takes control of the created IoT network.

17. The computer program product according to claim 16, wherein the creating a dynamic heterogeneous IoT network to respond to the specified event further includes identifying a location context for responding to the event.

18. The computer program product according to claim 17, wherein the selecting a master IoT device for the created network includes identifying one or more of the edge IoT devices having a defined capability based on the objective context and the location context for responding to the event.

19. The method according to claim 1, wherein:
the identifying an occurrence of a specified event includes the master device identifying the occurrence of the specified event; and
the IoT master device translating the desired response to be achieved to deal with the specified event into device specific commands and sending the device specific commands to the participatory IoT devices includes the master device identifying a set of capabilities of the created edge IoT network, identifying an instruction or instructions for each of the capabilities, mapping the instruction or instructions to device types, and mapping each of the device type instruction to one of the IoT devices of the created edge IoT network.

* * * * *